(12) United States Patent
Trakas

(10) Patent No.: US 7,172,410 B2
(45) Date of Patent: Feb. 6, 2007

(54) ADJUSTABLE VALVE PIN ASSEMBLY

(76) Inventor: Panos Trakas, 1769 Whispering Ct., Addison, IL (US) 60101

( * ) Notice: Subject to any disclaimer, the term of this patent is extended or adjusted under 35 U.S.C. 154(b) by 420 days.

(21) Appl. No.: 10/874,961

(22) Filed: Jun. 23, 2004

(65) Prior Publication Data

US 2004/0256767 A1    Dec. 23, 2004

Related U.S. Application Data

(60) Provisional application No. 60/480,777, filed on Jun. 23, 2003.

(51) Int. Cl.
*B29C 45/23* (2006.01)
(52) U.S. Cl. ....................... 425/564; 425/566
(58) Field of Classification Search ................ 425/564, 425/565, 566
See application file for complete search history.

(56) References Cited

U.S. PATENT DOCUMENTS

| | | |
|---|---|---|
| 3,491,408 A | 1/1970 | Natkins |
| 4,698,013 A | 10/1987 | Butcher |
| 4,747,770 A | 5/1988 | Schmidt |
| 4,899,435 A | 2/1990 | Trakas |
| 4,906,360 A | 3/1990 | Trakas |
| 4,988,848 A | 1/1991 | Trakas |
| 5,052,100 A | 10/1991 | Trakas |
| 5,055,028 A | 10/1991 | Trakas |
| 5,106,291 A | 4/1992 | Gellert |
| 5,136,141 A | 8/1992 | Trakas |
| 5,147,663 A | 9/1992 | Trakas |
| 5,180,594 A | 1/1993 | Trakas |
| 5,334,010 A | 8/1994 | Teng |

(Continued)

FOREIGN PATENT DOCUMENTS

| | | |
|---|---|---|
| EP | 0373 293 B1 | 6/1990 |
| EP | 0 407 683 B1 | 1/1991 |
| EP | 0657 270 A1 | 6/1995 |
| EP | 1 025 974 A2 | 8/2000 |

OTHER PUBLICATIONS

Drawings from 1996 Thermoplay SPA catalog showing Type D3 022 X "L" Valve Gate Assembly and Shut Off Valve for 022 Nozzle.

(Continued)

*Primary Examiner*—Tim Heitbrink
(74) *Attorney, Agent, or Firm*—Cook, Alex, McFarron, Manzo, Cummings & Mehler, Ltd.

(57) ABSTRACT

A valve pin adjustment system is provided for use in valve gated injection molding applications which enables adjustments to the positioning of the valve pin without necessitating removal of the clamping plates and valve assembly components, including valve pins. A piston associated with the valve pin includes a cylindrical body having first and second co-axially aligned internally threaded bores of respective first and second diameters. Preferably, the threads formed in the first and second bores are of the opposite hand. First and second externally-threaded cylindrical valve pin positioning members are respectively received in the first and second bores. Each of the positioning members includes a head portion and a tip portion. The tip of the second positioning member is in contact with the head of the first positioning member to lock the first positioning member in place, and the tip of the first positioning member is in contact with a head portion on the valve pin to locate the valve pin.

7 Claims, 4 Drawing Sheets

U.S. PATENT DOCUMENTS

| | | | |
|---|---|---|---|
| 5,849,343 | A | 12/1998 | Gellert et al. |
| 5,935,615 | A | 8/1999 | Gellert et al. |
| 5,948,448 | A * | 9/1999 | Schmidt .................. 425/564 |
| 6,074,191 | A | 6/2000 | Gllert et al. |
| 6,270,711 | B1 | 8/2001 | Gellert et al. |
| 6,739,863 | B2 | 5/2004 | Olaru |

OTHER PUBLICATIONS

Drawings from Jan. 1997 Husky Catalog for VG 750: manifold pocket detail (2B5.1.1); plate sizing pocket detail (2B5.2.1) and unlabeled drawing (2B5.OV).

Drawings from Jul. 1995 Mold-Masters catalog for: DC Pneumatic Valve Gate (5.03.19); DC Hydraulic Valve Gate (5.03.18); and DC Hydraulic Valve Gate without Cylinder (5.03.17).

Drawings from Aug. 1989 Dynisco Hotrunners catalog, for SR-20 VG Hot Runner Nozzle (p. 51); Hydraulic Modular Valve Gate Actuator (p. 49); and SR-20VG Installation Details and Heater Options (p. 53).

Steve Johnson, Troubleshooting Defects: Part II, Sep. 2004, Moldmaking Technology.

* cited by examiner

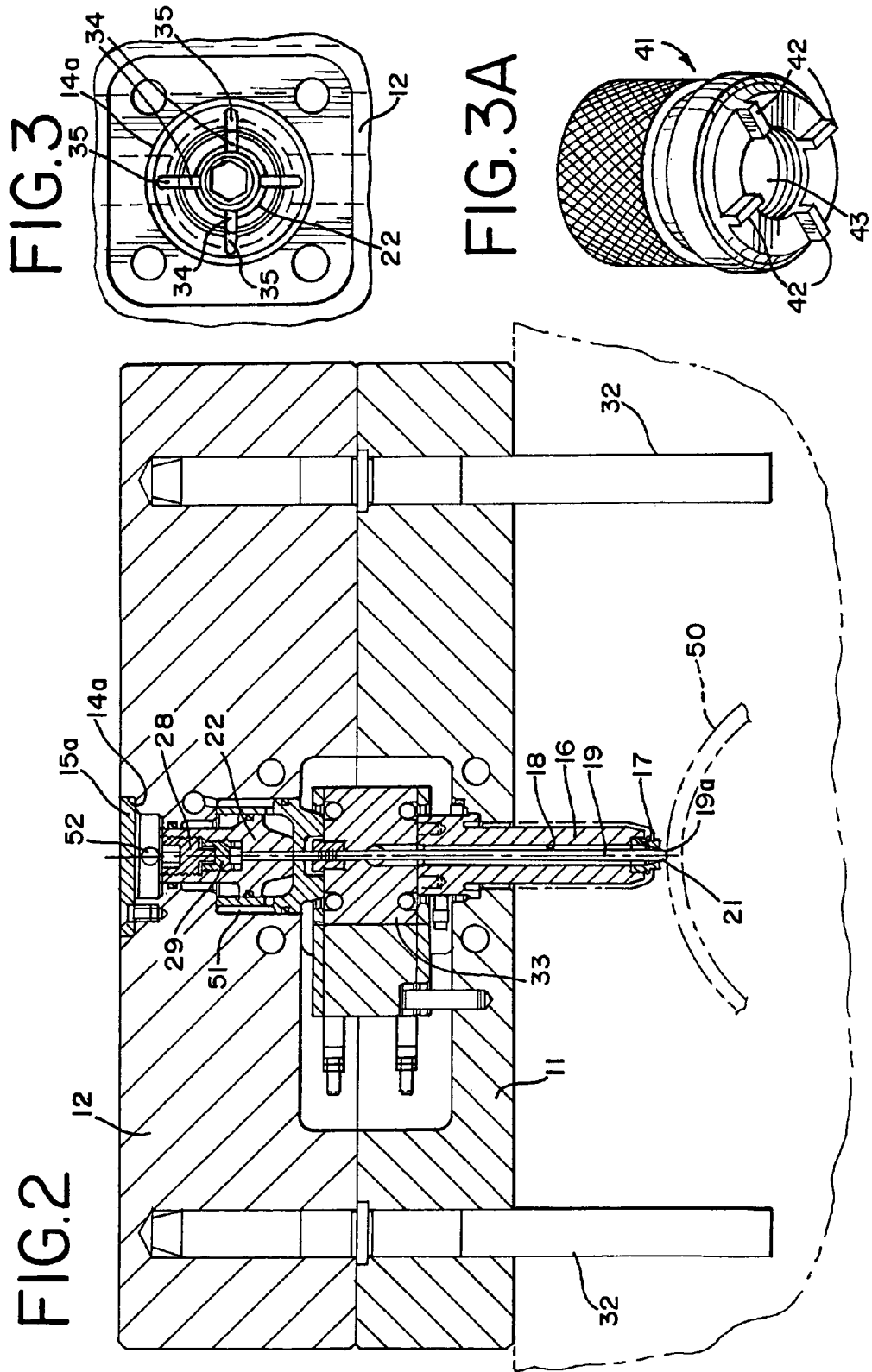

ADJUSTABLE VALVE PIN ASSEMBLY

CROSS-REFERENCE TO RELATED APPLICATION

This application claims the benefit of the filing date of provisional application Ser. No. 60/480,777, filed on Jun. 23, 2003.

BACKGROUND OF THE INVENTION

The present invention generally relates to valve gate systems wherein a reciprocating valve pin opens and closes a melt passageway in injection molding applications. More particularly, this invention relates to valve pin assembly and a method for adjusting valve pin position to ensure proper opening and closing of the melt passageway during injection molding operations.

Valve gated injection molding systems are known in which pistons are actuated pneumatically or hydraulically to reciprocate the valve member. In general, such systems require that the components, in particular the valve pin and its associated piston, be made to very close tolerances to allow for thermal expansion so that, when at operating temperatures, the front end of the valve pin seats precisely in the gate to close it. If the valve pin does not extend far enough into the gate, it will not seat tightly when in the closed position, leading to a poor gate vestige. If the valve pin extends too far toward the gate, the tip of the pin will repeatedly impact the gate on closing, thus causing undue wear of both the valve pin and the gate and, potentially, fracture of the mold around the gate.

Typically, final adjustment of the positioning of the valve pin is a complicated and time-consuming procedure. First, the hot runner system in which the valve pins are to be used is fitted to the mold plate(s) without the upper clamp plate and valve pins in place. The valve pins, which have been cut to a calculated length, are inserted into the assembly. A depth gauge is used to measure the position of the valve pin head at room temperature from a reference point, usually the back surface of the mold plate. The assembly is then heated to the processing temperature and held at that temperature for a period of time sufficient for all the hot runner components, including the valve pins, to be uniformly heated. The depth gauge is then used to measure the position of the valve pin head at operating temperature (the valve pin head's new position), and the amount of the adjustment of each valve pin is calculated based upon the differences of the two measurements. Specifically, if the valve pin is too long, it must be removed and shortened; if the valve pin is too short, the piston that carries the valve pin is removed and its bottom is ground to shorten the piston. This measurement and shortening/lengthening process is repeated for each valve pin in the system. It is, obviously, an exacting and time consuming process.

Accordingly, it is an object of the present invention to provide an improved valve pin assembly and method for adjusting the valve pin that facilitates the quick and precise positioning of the tip of the valve pin with respect to the mold gate.

SUMMARY OF THE INVENTION

In accordance with this invention, a novel valve pin adjustment system is provided for use in valve gate injection molding applications which enables adjustments to the positioning of the valve pin without necessitating removal of manifold plates and valve assembly components, including the valve pins. A piston that captures the head of the valve pin includes a cylindrical body having upper and lower internally threaded bores of respective first and second diameters. Preferably the upper bore is oppositely threaded with respect to the lower bore, and the upper and lower bores are in axial alignment with each other and with the valve pin. First and second externally threaded cylindrical valve pin positioning members are respectively threadedly received in the lower and upper bores. Each of the threaded positioning members includes a head portion and a tip portion. The head portions are each provided with a hex-shaped recess or equivalent tool-engaging surface for receiving a hex key wrench or the like. The tip of the first positioning member is in contact with the head portion of the valve pin to locate the valve pin, while the tip of the second positioning member is in contact with the head of the first positioning member to lock the first positioning member in place, so that first positioning member is restrained from unscrewing.

In use, and in contrast to the prior art, the entire hot half of the hot runner system is assembled, with the hot runner manifold completely enclosed and the valve pins in place with their tips in contact with the gates. As such, the system is fully functional, with all the valve gate assemblies operable. The hot runner system is then heated to operating temperature, thus causing all the components to expand to their operating size so that this expansion can be taken into account in the final positioning of the valve pins. The valve pins are gently tapped on their heads to insure that the tips are in contact with their respective gates, and, for each valve pin, the first positioning member is screwed into its piston until its tip contacts the head of the valve pin to positively locate the valve pin in its closed condition. Then the second positioning member is screwed into the piston in the opposite direction from the first positioning member until the tip of the second positioning member engages the head of the first positioning member, thus locking the first positioning member in place. A specially-designed wrench may be used to facilitate installing the positioning members. The cover plates for each valve pin assembly are then attached to the top clamp plate to complete the process.

In another aspect of the invention, the piston is received in a cylinder that also serves as the pressure pad and insulator between the top clamp plate and the manifold of the hot runner system. The well in the top clamp plate which overlies the cylinder and piston includes one or more radially-extending slots that, upon rotation of the piston, align with similarly radially-extending slots on the upper end of the piston. The specially-designed wrench may then be used which has one or more blades that engage the aligned slots, thus preventing rotation of the piston relative to the top clamp plate when the first and second threaded positioning members are being screwed into the piston.

In still another aspect of the invention, the bores in the piston and the cylinder which receives the shaft of the valve pin are oversized with respect to the diameter of the shaft of the valve pin to accommodate the lateral expansion of the manifold with respect to the mold center.

In a still further aspect of the invention, the shaft of the valve pin has one or more circumferential grooves that serve as a repository for any melt that may migrate through the manifold toward the cylinder and top plate.

BRIEF DESCRIPTION OF THE DRAWINGS

The present invention is now described in conjunction with the accompanying drawings in which like reference numerals designate like parts and wherein:

FIG. 2 is a side elevational view, partly in section, of assembled clamping plates, hot runner manifold and nozzle showing an embodiment of the valve pin adjustment system of the present invention;

FIG. 3 is fragmentary plan view of the top clamp plate with the access plate removed to show the well for receipt of the valve pin;

FIG. 3A is a perspective view of a specially designed tool for use in adjusting the position of the valve pin of the present invention.

DETAILED DESCRIPTION OF THE PREFERRED EMBODIMENT

Figure 1:
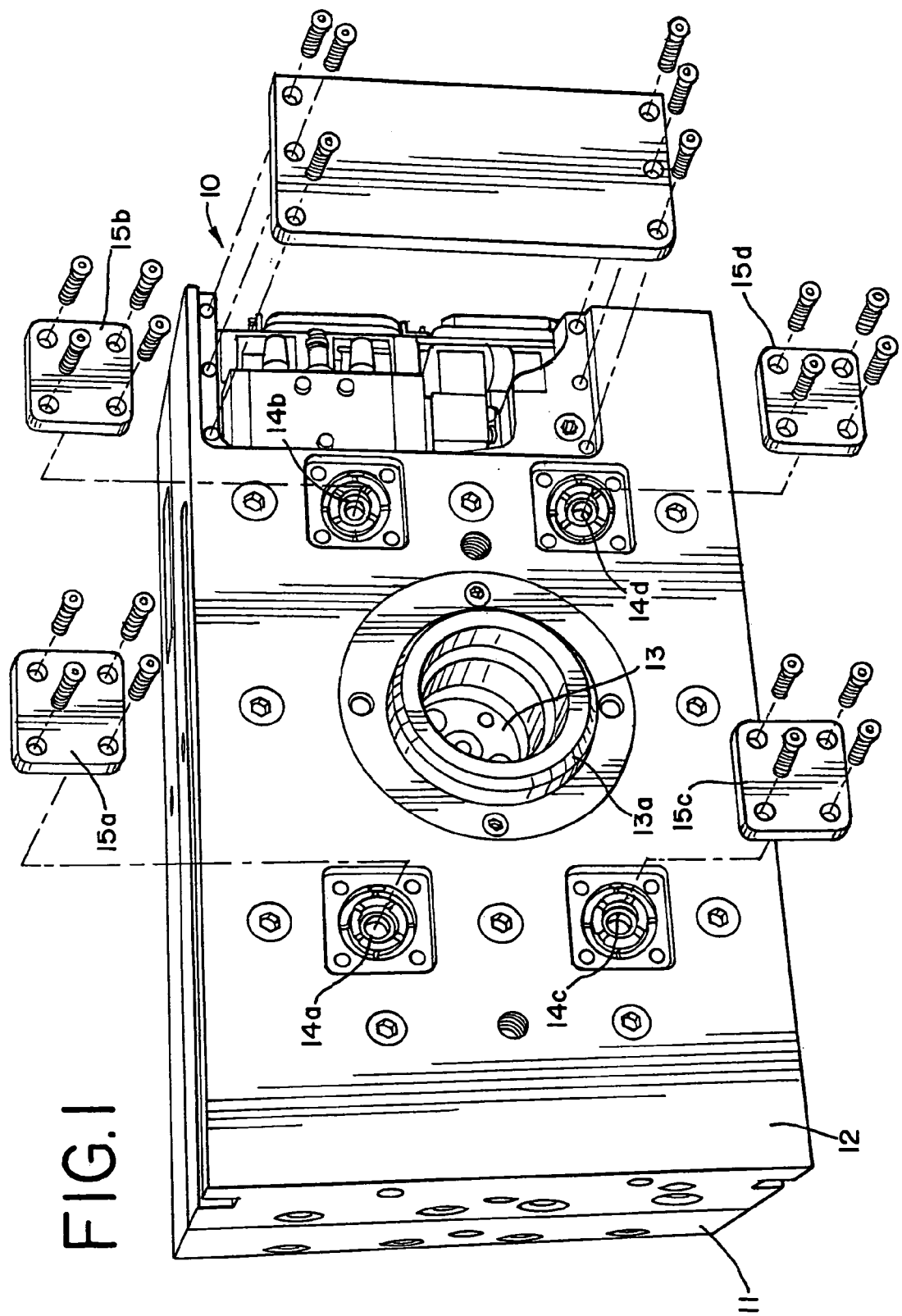
FIG. 1 is a perspective view of the assembled clamping plates and hot runner manifold (not seen) for use with the valve pin adjustment system of the present invention.

Referring to the drawings, and, in particular with reference to FIG. 1, a manifold system for a multi-cavity injection molding apparatus is generally depicted by the reference numeral 10 having a manifold plate 11 and a clamp plate 12. The hot runner manifold (not seen in FIG. 1) is clamped between the two plates 11 and 12, which are secured together by a plurality of bolts. The clamp plate 12 includes a locating ring 13a that fits into the bore of a platen of the molding machine for delivering pressurized melt to the system through an intake nozzle 13 on the manifold. A plurality of nozzle-access compartments or wells 14a, 14b, 14c and 14d (one for each nozzle) is provided. The associated cover plates are shown removed and are respectively designated by the reference numerals 15a, 15b, 15c and 15d. While the illustrated embodiment shows a system with four nozzles, any number of nozzles may be used, depending upon the particular application.

As is generally shown in FIG. 2, a heated nozzle 16 is provided having a nozzle seal 17 at the front end thereof, an internal melt-flow bore 18, and an elongated valve pin 19. The valve pin 19 comprises a shaft terminating in a tip 19a positioned to be selectively moved into open and closed positions with respect to a gate 21. The gate 21 communicates with a mold cavity 50 in a mold (shown in phantom) for alternately admitting melt into the cavity 50 and shutting-off the flow of melt. While the tip 19a is shown to be shaped with a taper and lapped, it is understood that it may be of various other shapes, such as circular, without departing from the invention.

Elongated pins 32 are provided to both locate and align each plate 11 and 12 with respect to each other and to align the assembled manifold system 10 with respect to its associated mold. The positioning pins 32 are installed in their respective holes in the manifold plate 11 prior to the placement of the clamp plate 12 thereon. The positioning pins 32 are sufficiently long to insure that the bore in the clamp plate 12 that receives the actuating piston and cylinder for the valve pin (described below) is properly aligned before the surfaces of the clamp plate 12 defining the bore come into contact with either the piston or cylinder. Thus, potential damage to the piston and cylinder during assembly due to the misalignment is avoided.

Similarly, the length of the locating pins 32 that extends beyond the manifold plate 11 is preferably greater than the length of the portion of the nozzle(s) 16 that extends out of the manifold plate 11. This insures that each nozzle seal 17 is properly aligned with its intended well in the mold before the system is assembled to the mold, thus avoiding potential damage to the nozzle seal(s) 17 due to misalignment.

Figure 4:
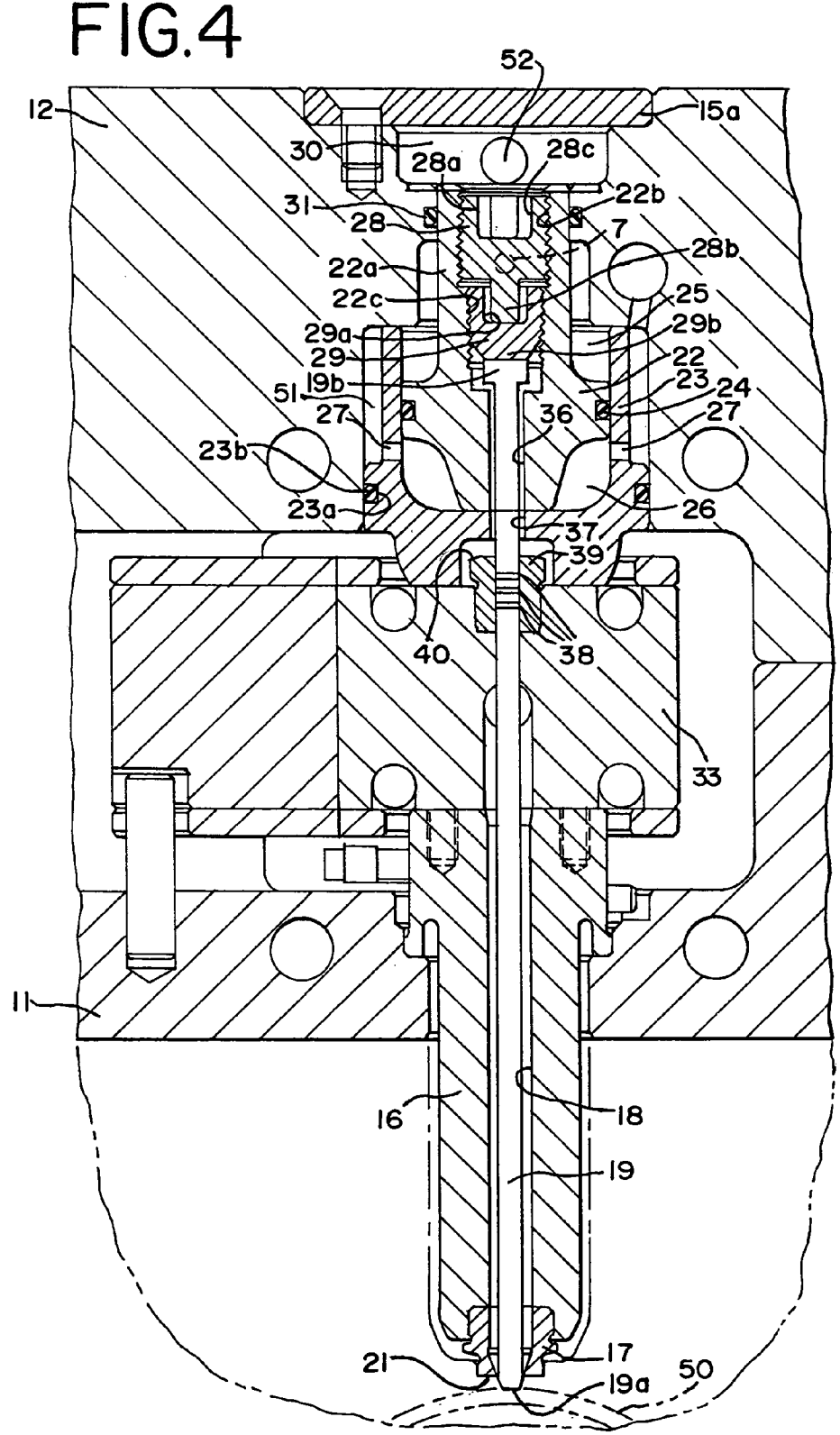
FIG. 4 is an enlarged sectional view of the valve pin adjustment system shown in FIG. 2.

Referring to FIGS. 2 and 4, a hot runner manifold 33 is shown which is clamped into position between the two plates 11 and 12 by means of a pressure pad/insulator 23 and the head of nozzle 16. Specifically, the pressure pad/insulator 23 engages the top side of the manifold 33, while the back end of the nozzle 16 engages the bottom side of the manifold 33. As set forth below, the pressure pad/insulator 23 also serves as the cylinder for the valve pin piston.

Figure 7:
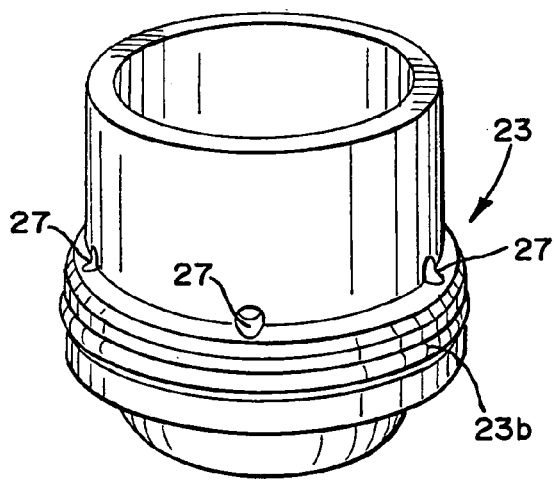
FIG. 7 is a perspective view of the cylinder of the valve pin adjustment system of the present invention wherein a portion of the upper interior portion thereof is viewable.
Figure 8:
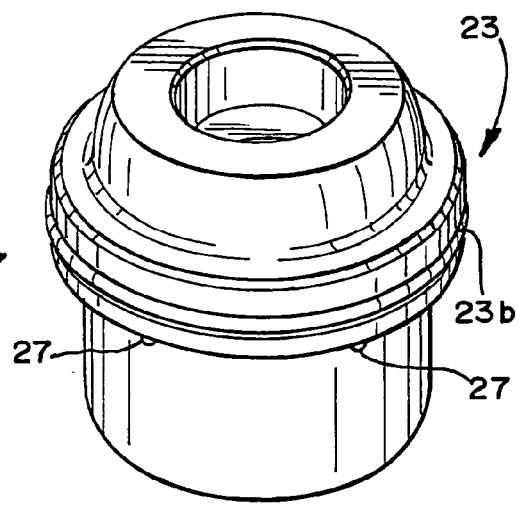
FIG. 8 is a perspective view of the cylinder shown in FIG. 7 in an inverted position.
Figure 9:
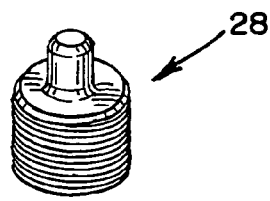
FIG. 9 is a perspective view of the upper valve pin positioning member.
Figure 10:
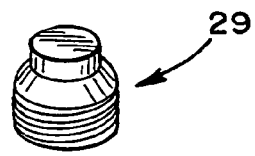
FIG. 10 is a perspective view of the lower valve pin positioning member.

In keeping with one aspect of the invention, a piston 22 is provided which is received for reciprocal movement within the cylinder 23. Advantageously, the pressure that is exerted on the top of the cylinder 23 by the top clamp plate 12 due to the expansion of the manifold 33 is such that an air-tight seal is created between the two. The lower end of the cylinder 23 forms a seal with respect to the top clamp 12 by means of an elastomeric O-ring 23b received in annular groove 23a in the outer wall of the lower portion of cylinder 23, thus allowing for a pressurized air to be admitted to the lower portion of the cylinder. Importantly, at least a portion of the cylinder wall forms a circumferential space 51 with respect to the clamp plate 12 to facilitate delivery of pressurized air to the interior of the cylinder. To this end, the lower chamber 26 of the cylinder 23 communicates with the space 51 by means of a plurality of air supply inlets 27 which are circumferentially disposed around the lower end of the cylinder 23 (best seen in FIG. 7). Similarly, the upper chamber 25 is supplied by a second air supply inlet 7 (shown in phantom in FIG. 4). Additionally, the piston 22 is provided with an annular ring seal 24 to form a pneumatic seal. Thus, a differential air-pressure can accumulate across the piston 22 between an upper chamber 25 and a lower chamber 26 in cylinder 23. By supplying pressurized air in alternating fashion to the chambers 25 and 26, reciprocating movement of the piston 22 is selectively provided.

In keeping with another aspect of the invention, threaded members are provided which are received in the piston 22 for properly positioning and locking the valve pin 19 into position, once properly located. To this end, an upper cylindrical portion 22a of piston 22 includes an upper bore 22b and a lower bore 22c. As illustrated, the upper and lower bores 22b, 22c are in axial alignment with each other. However, axial alignment is not required so long as access to the lower bore can be obtained through the upper bore for insertion of a first positioning member (described below). In the illustrated embodiment, upper bore 22b is shown to have a larger diameter than the lower bore 22c. Each of upper and lower bores 22b and 22c is provided with its own internal threads. Preferably, the threads on upper bore 22b are in an opposite direction to the lower bore 22c (e.g. upper bore 22b is provided with a left-hand thread and lower bore 22c is provided with a right-hand thread).

A first externally threaded cylindrical valve pin positioning member 29, which is in axial alignment with the valve pin 19 is received within the lower bore 22c. As shown, the first positioning member 29 includes a recess 29a, preferably hex-shaped, in a head portion thereof which is sized to receive a suitable hex wrench for screwing the first positioning member 29 into the lower threaded bore 22c. As shown, a tip portion 29b includes a flat end-face adapted for contact with the end-face of the valve pin head 19b.

A second externally threaded cylindrical valve pin positioning member 28 having a head portion 28a and a tip portion 28b is received within upper bore 22b. In the illustrated embodiment, head portion 28a includes a socket, also preferably hex-shaped, for receiving a suitable hex wrench or equivalent tool for screwing the second positioning member 28 into the threaded bore 22b. When screwed into the upper bore 22b, the second positioning member 28 serves to fix the location of the first positioning member 29 in the piston 22. Because the first and second positioning members are received in bores having opposite internal threads, they will not loosen or unscrew over time, thus maintaining the proper positioning of the valve pin.

The area immediately above the second valve pin positioning member 28 includes a chamber 30 which communicates with the atmosphere via hole 52. In accordance with an important aspect of the present invention, the cylindrical portion 22a of piston 22 is sealingly retained in the clamp plate 12 by means of an elastomeric seal 31 which is fitted between the clamp plate 12 and outer wall of the upper cylindrical portion 22a as shown.

Thus, in order to install the valve pin in an injection molding apparatus having a piston and positioning members as described above, the cover plate on the top clamp plate is removed to expose the well and provide access to the cylinder. The valve pin, with its tip already having been shaped and lapped, is then inserted through the piston and cylinder so that the valve pin extends through the melt passage with its tip in contact with the gate.

The system is then heated to its operating temperature, thus causing the valve pin to expand to its operating length, as well as causing the other components of the systems to expand to their operating size. As can be appreciated, the valve pin assembly, once raised to operating temperature, is functional at this point, as the top clamp plate is in position secured to the lower clamp plate, and pressurized air can be delivered to the cylinder. The valve pin head is then gently tapped to insure that the tip is in sealing contact with the gate. If the tip of the valve pin fails to contact the gate due to the valve pin being too short, the bottom surface of the piston can be machined to effectively lengthen the shaft of the valve pin. This would require disassembling the clamp plate from the system, which is highly undesirable and results in the disadvantages associated with the prior art. Alternatively, the lower face of the valve pin can be machined to effectively lengthen the shaft. Significantly, the present invention permits the use of valve pins with overly long shafts without requiring machining of the valve pin to properly position the tip. Specifically, if the valve pin is too long, a space results between the lower surface of the head of the valve pin and the opposed surface on the piston when the valve pin closes the gate (as best seen in FIG. 4). Thus, when the valve pin is moved from its retracted position to the closed position to the gate, the valve pin floats until its head is contacted by the first positioning member. Accordingly, it is preferred to intentionally make the valve pins oversized in length. Then the piston will not need to be removed or the lower face of the valve pin machined in order to properly position the valve pin.

The first externally-threaded positioning member is then screwed into the lower internally-threaded bore in the piston until it contacts the head of the valve pin, but not farther, so that it serves as a positive stop to prevent the valve pin from backing up short of the gate. This insures that, during operation, the valve pin will not extend too far toward the gate, yet will firmly close the gate to achieve a good gate vestige. Then the second externally-threaded positioning member is screwed in the opposite direction into the upper internally-threaded bore in the piston until the tip portion engages the head portion of the first positioning member interior of the socket in the head. This locks the first positioning member in place. The cover plate can then be reattached to the top plate. This general procedure is repeated for each nozzle in the system.

Figure 5:
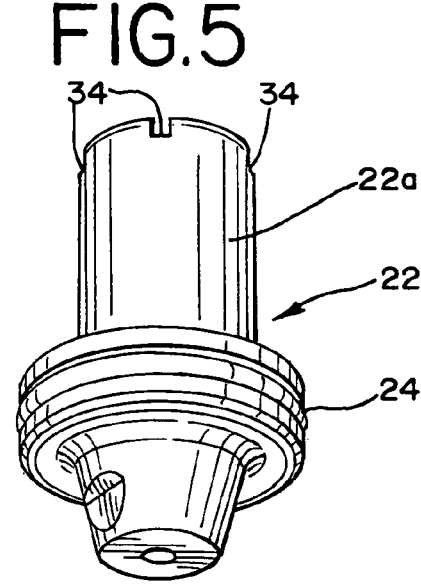
FIG. 5 is a perspective view of the piston of the valve pin adjustment system of the present invention showing the lower portion thereof.
Figure 6:
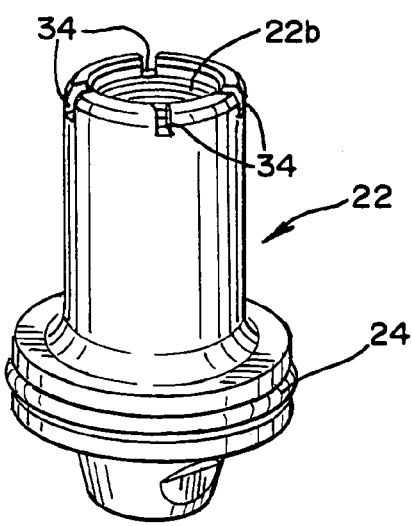
FIG. 6 is a perspective view of the piston shown in FIG. 5 showing the internal threads in the upper bore thereof.

In keeping with another aspect of the invention, means are provided for preventing rotation of the piston 22 with respect to the well 14a when the first and second positioning members 28 and 29 are screwed into the piston. With reference to FIGS. 5 and 6, the top end of the piston 22 includes one or more radially-extending notches 34 (four shown) that are substantially equally spaced about the upper edge of the piston 22. As best seen in FIG. 3, the well 14a includes a corresponding number of radially-extending slots 35 having a depth and width similar to the notches 34 in the top of the piston 22. In order to prevent rotation of the piston 22 with respect to the well 14a during the placement of the first or second positioning members, and to apply torque to the positioning members, a specially-designed tool 41, shown in FIG. 3A, may be used which has a blade-like portion 42 that is received in both the notches 34 and slots 35 aligned therewith, thus preventing relative rotation. As can be appreciated, the tool 41 has a central bore 43 through which a further tool, i.e., a hex wrench, can be inserted that will engage the sockets in the head portions of the positioning members. Alternatively, the slots 35 in the well 14a may be eliminated, while the notches 34 in the top of the piston 22 are retained. The blades 41 of the tool 41 are then located so as to engage only the notches 34 in the piston 22. In this case, the tool 40 is gripped by the installer to prevent rotation of the piston 22, in contrast to the illustrated embodiment in which the tool 40 does not need to be held during installation of the positioning members.

In keeping with another aspect of the invention, both the piston 22 and the cylinder 23 have an oversized bore, 36 and 37, respectively, for receiving the shaft of the valve pin 19 (best seen in FIG. 4). In contrast, the diameter of the bore in the manifold 33 for receiving the shaft valve pin 19 provides for a very close fit. The enlarged bores 36, 37 allow some lateral shifting of the valve pin 19 upon lateral expansion of the manifold 33 with respect to the mold center during the cycling of the system, thus reducing the likelihood of the valve pin shafts being bent or flexed.

In a further aspect of the invention, the valve pin 19 is provided with one or more circumferential grooves 38 (best seen in FIG. 4, three shown), which are located such that during reciprocation of the valve pin, they move between a position in which the grooves 38 are located within the manifold seal 39 and a chamber 40 formed between the lower end of the cylinder 23 and the manifold 33 (best seen in FIG. 4). Preferably, the upper surface of the manifold 33 carries a manifold seal 39, through which the valve pin 19 passes. The circumferential grooves 38 in the valve pin 19 serve as a repository for any melt that may migrate from the melt flow bore 18 up the shaft of the valve pin past the seal 39. As the valve pin 19 is reciprocated, and the circumferential rings 38 move between the chamber 40 and the seal 39, any melt that has collected in the circumferential grooves 38 will be sheared off and collect in the chamber 40.

Thus, an improved adjustable valve pin assembly has been provided that meets the object of the present invention. While the invention has been described in terms of a preferred embodiment, there is no intent to limit it to the same. Instead, the scope of the invention is defined by the following claims.

What is claimed:

1. A valve gated injection molding apparatus comprising:
    a nozzle having a melt passage therethrough extending to a gate;
    a valve pin having an elongated shaft with a front end terminating in a tip and a rear end terminating in an enlarged head;
    a piston adapted to capture the head of the valve pin, the elongated shaft of the valve pin extending through the piston into the melt passage to the gate, the piston comprising a body having first and second internally-threaded bores of respective first and second diameters; and
    first and second externally-threaded valve pin positioning members adapted to be received in the first and second bores in the body of the piston, the first positioning member engaging the head of the valve pin and the second positioning member contacting the first positioning member to lock the first positioning member in place.

2. The valve gated injection molding apparatus of claim 1 wherein the first and second bores in the body of the piston are oppositely threaded.

3. The valve gated injection molding apparatus of claim 1 wherein each of the first and second positioning members has a head and a tip, the head being configured with a surface adapted to be engaged by a torque-applying tool, the tip of the first positioning member adapted to contact the valve pin, and the tip of the second positioning member being adapted to engage the head of the first positioning member.

4. The valve gated injection molding apparatus of claim 3 wherein the heads of the first and second positioning members are recessed and the tip of the second positioning member is sized to be received in the recess in the head of the first positioning member.

5. The valve gated injection molding apparatus of claim 1 wherein the piston has at least one slot formed therein adapted to be engaged by a tool so as to prevent rotation of the piston.

6. A valve gated injection molding apparatus comprising:
    at least one nozzle having a melt passageway therethrough extending to a gate;
    a manifold to deliver melt to the nozzle;
    first and second clamp plates to enclose the manifold and maintain the nozzle in contact therewith;
    a cylinder positioned between the first clamp plate and the manifold in alignment with the nozzle;
    a valve pin having an elongated shaft with a front end terminating in a tip and a rear end terminating in an enlarged head;
    a piston adapted to be received in the cylinder for capturing the head of the valve pin, the elongated shaft of the valve pin extending through the piston into the melt passage to the gate, the piston comprising a cylindrical body having first and second internally-threaded bores of respected first and second diameters;
    first and second externally-threaded valve pin positioning members adapted to be received in the first and second bores in the body of the piston, the first positioning member engaging the head of the valve pin and the second positioning member contacting the first positioning member to lock the first positioning member in place.

7. The valve gated injection molding apparatus of claim 6 wherein the first clamp plate includes a well through which access to the internally-threaded bores in the body of the piston is obtained, each of the well and the body of the piston having at least one slot, the slots being alignable upon rotation of the piston so as to receive a tool to prevent rotation of the piston with respect to the first clamp plate and to apply torque to the positioning members.

* * * * *